United States Patent
Kim

(10) Patent No.: US 11,738,683 B2
(45) Date of Patent: Aug. 29, 2023

(54) DRIVER ASSIST DEVICE AND ADAPTIVE WARNING METHOD THEREOF

(71) Applicants: Hyundai Motor Company, Seoul (KR); Kia Motors Corporation, Seoul (KR)

(72) Inventor: Dae Young Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 245 days.

(21) Appl. No.: 16/985,561

(22) Filed: Aug. 5, 2020

(65) Prior Publication Data
US 2021/0276484 A1  Sep. 9, 2021

(30) Foreign Application Priority Data
Mar. 3, 2020 (KR) .................. 10-2020-0026644

(51) Int. Cl.
*B60Q 9/00* (2006.01)
*B62D 1/06* (2006.01)

(52) U.S. Cl.
CPC .............. *B60Q 9/00* (2013.01); *B62D 1/06* (2013.01); *B60W 2540/225* (2020.02)

(58) Field of Classification Search
CPC ...... B60Q 9/00; B60Q 1/06; B60W 2540/225
USPC ........................................................ 701/45
See application file for complete search history.

(56) References Cited

U.S. PATENT DOCUMENTS

| | | | |
|---|---|---|---|
| 9,262,924 B2* | 2/2016 | McNew | G02B 27/01 |
| 9,308,914 B1* | 4/2016 | Sun | B60W 30/143 |
| 9,751,534 B2* | 9/2017 | Fung | G06V 10/764 |
| 10,448,180 B1* | 10/2019 | Helm | B60R 11/0217 |
| 2003/0167660 A1* | 9/2003 | Kondou | E02F 9/02 37/348 |
| 2010/0079270 A1* | 4/2010 | Krautter | G06F 3/013 340/436 |
| 2013/0150741 A1* | 6/2013 | Noh | A61B 5/18 600/508 |
| 2015/0145995 A1* | 5/2015 | Shahraray | H04W 4/021 348/148 |
| 2016/0001781 A1* | 1/2016 | Fung | G07C 9/37 701/36 |
| 2016/0009175 A1* | 1/2016 | McNew | G01C 21/3652 340/438 |
| 2016/0054452 A1* | 2/2016 | Cosatto | G01S 17/931 701/412 |
| 2016/0068103 A1* | 3/2016 | McNew | B60W 50/14 701/23 |
| 2016/0171321 A1* | 6/2016 | Ohsuga | A61B 5/168 345/419 |

(Continued)

*Primary Examiner* — Zhen Y Wu
(74) *Attorney, Agent, or Firm* — Fox Rothschild LLP

(57) ABSTRACT

A driver assist device and an adaptive warning method thereof are provided. The driver assist device includes a processor and a non-transitory storage medium containing program instructions executed by the processor. The processor detects outdoor and indoor information of a vehicle using a detector and determines a warning mode based on a traveling situation and a driver state identified through the detector when a warming-requiring situation is recognized during an operation of a driver assist function. A warning is then output based on the determined warning mode.

19 Claims, 10 Drawing Sheets

(56) References Cited

U.S. PATENT DOCUMENTS

| | | | |
|---|---|---|---|
| 2016/0196098 A1* | 7/2016 | Roth | G09G 5/00 |
| | | | 715/761 |
| 2016/0318520 A1* | 11/2016 | Bigdelou | B60W 60/0053 |
| 2016/0378112 A1* | 12/2016 | Ljubuncic | B60W 30/16 |
| | | | 701/45 |
| 2017/0146358 A1* | 5/2017 | Ward | A45B 25/00 |
| 2017/0305342 A1* | 10/2017 | Tomioka | B60Q 9/008 |
| 2017/0369075 A1* | 12/2017 | Hwang | B60W 50/082 |
| 2018/0126901 A1* | 5/2018 | Levkova | G06V 20/597 |
| 2018/0365533 A1* | 12/2018 | Sathyanarayana | G08G 1/0145 |
| 2019/0278268 A1* | 9/2019 | Rezaeian | G05D 1/0061 |
| 2019/0283672 A1* | 9/2019 | Daman | B60W 50/14 |
| 2019/0317493 A1* | 10/2019 | Park | G05D 1/0061 |
| 2020/0017124 A1* | 1/2020 | Camhi | G06N 20/00 |
| 2020/0260182 A1* | 8/2020 | Son | H04R 29/006 |
| 2020/0379460 A1* | 12/2020 | Stent | G06V 10/82 |
| 2022/0076040 A1* | 3/2022 | Delahaye | B60W 40/08 |

* cited by examiner

DRIVER ASSIST DEVICE AND ADAPTIVE WARNING METHOD THEREOF

CROSS-REFERENCE TO RELATED APPLICATION

This application claims the benefit of priority to Korean Patent Application No. 10-2020-0026644, filed on Mar. 3, 2020, the entire contents of which are incorporated herein by reference.

TECHNICAL FIELD

The present disclosure relates to a driver assist device and an adaptive warning method thereof, and more particularly, to a driver assist device and an adaptive warning method thereof that output a warning based on a driver state and a traveling situation.

BACKGROUND

An advanced driver assist system (ADAS) outputs a predefined warning form when a warning-requiring situation occurs. However, such an advanced driver assist system does not generate a warning adaptive to the warning-requiring situation. Therefore, the conventional advanced driver assist system is not able to provide an effective warning adaptive to the warning-requiring situation to a driver such as a case in which only a visual warning is output when the driver is not looking forward or a case in which only an auditory warning is output when the driver has a hearing impairment.

SUMMARY

The present disclosure provides a driver assist device and an adaptive warning method thereof that output a warning based on a driver state and a traveling situation. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a driver assist device may include a processor, and a non-transitory storage medium containing program instructions executed by the processor. The processor may be configured to detect outdoor and indoor information of a vehicle using a detector (e.g., sensor), and a controller may be configured to determine a warning mode based on a traveling situation and a driver state identified through the detector when a warning-requiring situation is detected during an operation of a driver assist function, and output a warning based on the determined warning mode.

The controller may be configured to determine a visual warning when a driver is looking forward in response to detecting a hands-off warning-requiring situation, and determine at least one of an auditory warning or a tactile warning together with the visual warning when the driver is not looking forward. The controller may not output the warning when a direction indicating signal is activated in a lane change direction or hands of a driver are on a steering wheel when detecting a lane change warning-requiring situation.

The controller may be configured to determine a visual warning when the driver is looking forward in a state where the direction indicating signal is not activated in the lane change direction and the hands of the driver are separated from the steering wheel, and determine at least one of an auditory warning or a tactile warning together with the visual warning when the driver is not looking forward in the state where the direction indicating signal is not activated in the lane change direction and the hands of the driver are separated from the steering wheel.

Additionally, the controller may be configured to determine a visual warning when a driver is looking forward in a state where hands of the driver are separated from a steering wheel when a warning-requiring situation of deactivation or limit of the driver assist function is detected, and determine at least one of an auditory warning or a tactile warning together with the visual warning when the driver is not looking forward in the state where the hands of the driver are separated from the steering wheel. The controller may be configured to determine at least one of an auditory warning or a tactile warning together with a visual warning when a driver is not looking at a cut-in vehicle when a cut-in vehicle waring-requiring situation is recognized.

Further, the controller may be configured to determine a visual warning when a driver is looking forward when a forward-looking warning-requiring situation is detected, and determine at least one of an auditory warning or a tactile warning together with the visual warning when the driver is not looking forward. The controller may be configured to determine at least one of an auditory warning or a tactile warning together with a visual warning when the driver is not looking forward when an override warning-requiring situation is detected.

The controller may be configured to determine a visual warning when a driver is looking at a side mirror in a direction matching a direction indicator input when a diagonally-rearward warning-requiring situation is detected, and determine at least one of an auditory warning or a tactile warning together with the visual warning when the driver is not looking at the side mirror in the direction matching the direction indicator input. In addition, the controller may be configured to, when an in-vehicle noise level measured by the detector is equal to or greater than a preset reference noise level when outputting an auditory warning, adjust the output of the auditory warning or replace the auditory warning with a tactile warning and output the tactile warning. The controller may be configured to additionally output at least one of an auditory warning or a tactile warning when a field of view of a driver is obstructed when outputting a visual warming.

According to another aspect of the present disclosure, an adaptive warning method of a driver assist device may include detecting a warning-requiring situation during an operation of a driver assist function, determining a warning mode based on a traveling situation and a driver state when the warning-requiring situation is detected, and outputting a warning based on the determined warning mode.

The determining of the warning mode may include determining a visual warning as the warning mode when a driver is looking forward in a hands-off warning-requiring situation, and determining at least one of an auditory warning or a tactile warning together with the visual warning when the driver is not looking forward. The determining of the warning mode may include determining not to warn when a direction indicating signal is activated in a lane change direction or when hands of a driver are on a steering wheel in a lane change warning-requiring situation.

Additionally, the determining of the warning mode may include determining a visual warning when the driver is looking forward in a state where the direction indicating signal is not activated in the lane change direction and the hands of the driver are separated from the steering wheel, and determining at least one of an auditory warning or a tactile warning together with the visual warning when the driver is not looking forward in the state where the direction indicating signal is not activated in the lane change direction and the hands of the driver are separated from the steering wheel.

The determining of the warning mode may include determining a visual warning when a driver is looking forward in a state where hands of the driver are separated from a steering wheel in a warning-requiring situation of deactivation or limit of the driver assist function, and determining at least one of an auditory warning or a tactile warning together with the visual warning when the driver is not looking forward in the state where the hands of the driver are separated from the steering wheel. In addition, the determining of the warning mode may include determining at least one of an auditory warning or a tactile warning together with a visual warning when a driver is not looking at a cut-in vehicle in a cut-in vehicle warning-requiring situation.

Further, the determining of the warning mode may include determining a visual warning when a driver is looking forward in a forward-looking warning-requiring situation, and determining at least one of an auditory warning or a tactile warning together with the visual warning when the driver is not looking forward. The determining of the warning mode may include determining at least one of an auditory warning or a tactile warming together with a visual warning when the driver is not looking forward when an override warning-requiring situation is detected. The determining of the warning mode may include determining a visual warning when a driver is looking at a side mirror in a direction matching a direction indicator input in a diagonally-rearward warning-requiring situation, and determining at least one of an auditory warning or a tactile warning together with the visual warning when the driver is not looking at the side mirror in the direction matching the direction indicator input.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
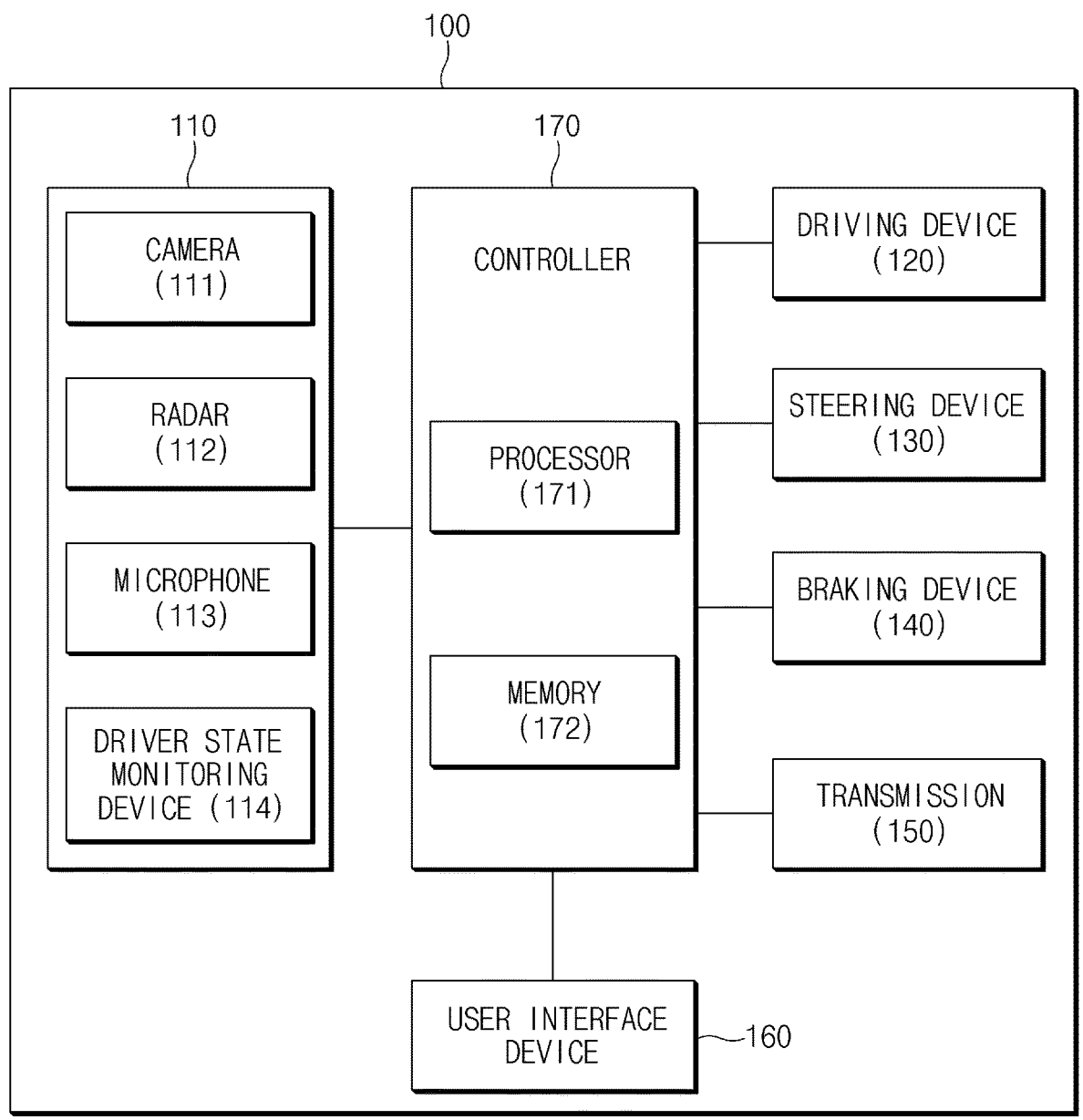
FIG. 1 is a block diagram of a driver assist device according to one exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of the related known configuration or function will be omitted when it is determined that it interferes with the understanding of the embodiment of the present disclosure.

In describing the components of the exemplary embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a driver assist device according to one exemplary embodiment of the present disclosure. Referring to FIG. 1, a driver assist device 100 may include a detector 110 (e.g., a sensor), a driving device 120, a steering device 130, a braking device 140, a transmission 150, a user interface device 160, and a controller 170. The controller 170 may be configured to exchange data with the driving device 120, the steering device 130, the braking device 140, and/or the user interface device 160 via an in-vehicle network (IVN). In this connection, the in-vehicle network may be implemented as a controller area network (CAN), a media oriented systems transport (MOST) network, a local interconnect network (LIN), an ethernet, and/or a X-by-Wire (Flexray). Although not shown in the drawings, each of the driving device 120, the steering device 130, the braking device 140, and the user interface device 160 may include a communication module, a processor, and a memory.

The detector 110 may be configured to detect traveling environment information and driver information (e.g., outdoor information and indoor information of a vehicle) using sensors and electronic control devices mounted within the vehicle. The detector 110 may be configured to detect the traveling environment information and the driver information (e.g., driver state information) using a camera 111, a radio detecting and ranging (RADAR) 112, a microphone 113, and/or a driver state monitoring device 114, which are mounted within the vehicle. The traveling environment information may include line information, object information, and/or an in-vehicle noise degree (e.g., an in-vehicle noise level).

The detector 110 may be configured to obtain the line information and/or the object information by analyzing an image captured by the camera 111. The line information may include a line curvature and/or a traveling lane, and the object information may include a surrounding vehicle location, a surrounding vehicle speed, and/or an obstacle location, and the like. The camera 111 may be mounted on front, rear, and/or side faces of the vehicle to obtain an image of a surrounding region of the vehicle. The camera 111 may include at least one of image sensors of a charge coupled device (CCD) image sensor, a complementary metal oxide semi-conductor (CMOS) image sensor, a charge priming device (CPD) image sensor, or a charge injection device (CID) image sensor. The camera 111 may include an image processor configured to perform image processing such as noise removal, color reproduction, file compression, image quality adjustment, saturation adjustment, and the like for an image obtained through the image sensor.

The detector 110 may be configured to detect the object information through the RADAR 112. The RADAR 112 may be configured to measure a location, a speed, and the like of an object that is located around the vehicle. The RADAR 112 may be configured to generate an electromagnetic wave to the surrounding object and receive the electromagnetic wave reflected from the surrounding object to identify a distance from the surrounding object, a direction and/or an altitude of the surrounding object. The RADAR 112 may be replaced by a light detection and ranging (LiDAR), an ultrasonic sensor, and/or a combination of the RADAR 112, the LiDAR, and the ultrasonic sensor.

The detector 110 may be configured to measure the in-vehicle noise level through the microphone 113. In other words, the detector 110 may use the microphone 113 to measure a level of traveling noise introduced from an outside of the vehicle into the vehicle. The microphone 113 may be configured to collect sound generated in the vehicle, convert the sound into an electrical signal, and output the electrical signal. In the microphone 113, various noise removal algorithms for removing noise input together during a process of receiving an audio signal may be implemented. The detector 110 may be configured to detect information such as whether hands of a driver are separated from a steering wheel, whether the hands of the driver are on the steering wheel, and whether a driver assist function has been overridden using a touch sensor (not shown) mounted on the steering wheel and/or an accelerator pedal location sensor (not shown).

The detector 110 may be configured to obtain the driver state information through the driver state monitoring device 114. The driver state monitoring device 114 may be configured to recognize a driver state using sensors such as an image sensor (not shown) and/or a biometric sensor (not shown) installed in front of a driver's seat in the vehicle, by the present disclosure is not limited to such a positioning. The driver state monitoring device 114 may be configured to detect whether the driver is looking forward, a looking/gaze direction, whether the driver is looking at a side mirror, and/or whether the driver is looking at a cut-in vehicle (e.g., a vehicle cutting into the subject vehicle's driving lane). The driving device 120, which is an actuator configured to operate a power source (a power generator) of the vehicle, such as an engine and/or a motor, may be configured to adjust acceleration of the vehicle. The driving device 120 may be configured to adjust a driving torque of the power source based on accelerator pedal position information output from the accelerator pedal location sensor. The driving device 120 may be configured to adjust output of the power source to support a traveling speed of the vehicle requested from the controller 170 during autonomous driving.

The steering device 130, which is an actuator configured to adjust steering of the vehicle, may be implemented as a motor drive power steering (MDPS). The steering device 130 may be configured to adjust a steering angle of the vehicle under control of the controller 170. The braking device 140, which is an actuator configured to adjust deceleration of the vehicle, may be configured to adjust a braking pressure based on the brake pedal position sensed by the brake pedal position sensor, or adjust the braking pressure under control of the controller 170. The transmission 150, which is an actuator configured to adjust speed change of the vehicle, may be implemented as a shift by wire (SBW). The transmission 150 may be configured to adjust the speed change of the vehicle based on a gear position and a gear state range.

The user interface device 160 may include an input device configured to generate data (e.g., user input) based on user manipulation, and an output device configured to output visual information, auditory information, and/or tactile information. The input device may be installed on a steering wheel, a dashboard, a center fascia, and/or a door trim, and receives data from the user. The input device may be implemented as a keyboard, a keypad, a button, a switch, a touch pad, and/or a touch screen. The output device may include a display, an audio output device, a tactile signal output device, and the like. The display may include at least one of a liquid crystal display (LCD), a thin film transistor-liquid crystal display (TFT LCD), an organic light-emitting diode (OLED) display, a flexible display, a 3-dimensional display (3D display), a transparent display, a head-up display (HUD), a touch screen, or a cluster. The audio output device may be configured to output audio data (e.g., a warning sound and/or a warning voice message) stored in a memory 172. The audio output device may include a receiver, a speaker, and/or a buzzer. The tactile signal output device may be configured to output a signal in a form that the user may perceive using a tactile sense. For example, the tactile signal output device may be implemented as a vibrator to adjust an intensity, a pattern, and the like of vibration.

The controller 170 may be configured to execute overall operations of the driver assist device 100. In particular, the controller 170 may be configured to execute the driver assist function such as lane maintenance control, inter-vehicle distance control, blind spot detection, and the like. The controller 170 may include a processor 171 and the memory 172. The processor 171 may be implemented as at least one of an application specific integrated circuit (ASIC), a digital signal processor (DSP), a programmable logic device (PLD), a field programmable gate array (FPGA), a central processing unit (CPU), a microcontroller, or a microprocessor.

The memory 172 may be a non-transitory storage medium containing program instructions executed by the processor 171, and may store the audio data such as the warning sound and/or the warning voice message. The memory 172 may be implemented as at least one of storage media (recording media) such as a flash memory, a hard disk, a secure digital Card (SD card), a random access memory (RAM), a static random access memory (SRAM), a read only memory (ROM), a programmable read only memory (PROM), an electrically erasable and programmable ROM (EEPROM), an erasable and programmable ROM (EPROM), a register, or the like.

The processor 171 may be configured to identify the traveling situation and/or the driver state using the detector 110 when a warning-requiring situation occurs while performing the driver assist function. The processor 171 may be configured to detect a traveling situation based on the traveling environment information such as the line information, the object information, the in-vehicle noise level, and the like obtained through the camera 111, the RADAR 112, and/or the microphone 113. The traveling situation may include whether a direction indicating signal is activated, whether the hands of the driver are separated from the steering wheel, whether the hands of the driver are on the steering wheel, whether the driver assist function has been overridden, and/or whether a current traveling lane is appropriate. The processor 171 may be configured to detect the driver state using the driver state monitoring device 114. In other words, the processor 171 may be configured to recognize whether the driver is looking forward, the looking or gaze direction of the driver, whether the driver is looking at the side mirror, and/or whether the driver is looking at the cut-in vehicle through the driver state monitoring device 114.

The processor 171 may be configured to determine a warning mode based on the traveling situation and/or the driver state. In this connection, the warning mode may include at least one of the visual warning, the auditory warning, or the tactile warning. The processor 171 may be configured to operate the user interface device 160 to output a warning based on to the determined warning mode. For example, when the warning mode is determined as the visual warning, the processor 171 causes the visual information such as a text, an icon, a symbol, and/or an image to be displayed on the display. When the warning mode is determined as the auditory warning, the processor 171 may be configured to output the auditory information such as the warning sound and/or the voice message through the speaker. When the warning mode is determined as the tactile warning the processor 171 may be configured to operate the tactile signal output device to output the tactile information such as the vibration.

The processor 171 may be configured to measure the in-vehicle noise level (e.g., an indoor noise level of the vehicle) using the microphone 113 when outputting the auditory warning. When the in-vehicle noise level is equal to or greater than a preset reference noise level, the processor 171 may be configured to adjust a level (e.g., a volume) of the auditory warning, for example, the warning sound to be increased, or may be configured to replace the auditory warning with the tactile warning and output the tactile warning. For example, the processor 171 may be configured to increase an output of the auditory warning (e.g., the volume of the warning sound) when the vehicle travels with a window open and the external traveling noise is introduced into the vehicle.

In addition, when a field of view of the driver is obstructed due to backlight, sunglasses worn by the driver, and the like in a situation in which the warning is output (occurred), the processor 171 may be configured to additionally generate the auditory warning and/or the tactile warning. For example, when the field of view of the driver is obstructed while outputting the visual warning, the processor 171 may be configured to additionally output the auditory warning and/or the tactile warning together while outputting the visual warning.

Hereinafter, an adaptive warning method based on the traveling situation and/or the driver state for each warning-requiring situation will be described in detail.

Hands-Off Warning-Requiring Situation

The processor 171 may be configured to generate (output) a hands-off warning in response to detecting that the hands of the driver are separated from the steering wheel during the lane maintenance control. The processor 171 may be configured to determine whether the driver is looking forward using the detector 110 during the hands-off warning. Additionally, the processor 171 may be configured to determine a warning mode based on whether the driver is looking forward, and output a warning based on the determined warning mode. In the hands-off warning-requiring situation, when the driver is looking forward, the processor 171 may be configured to generate only the visual warning as a primary warning. In the hands-off warning-requiring situation, when the driver is not looking forward, the processor 171 may be configured to generate the auditory warning and/or the tactile warning in addition to the visual warning as the primary warning. When the driver looks forward again while outputting the auditory warning as the hands-off first warning or a second warning, the processor 171 may be configured to adjust the output of the auditory warning, that is, the volume of the warning sound, to be decreased.

Lane Change Warning-Requiring Situation

When the lane change warning-requiring situation occurs during the lane maintenance control, the processor 171 may be configured to determine the warning mode based on whether the direction indicating signal for a lane change is activated, whether the hands of the driver are on the steering wheel, and whether the driver is looking forward and output the warning based on the determined warning mode. For example, when the vehicle is within a particular distance from a branch point while not traveling in a branch lane for entering a branch path on a navigation path or not traveling in a lane right next to the branch lane, the processor 171 may be configured to detect such case as the lane change warning-requiring situation. In response to detecting the occurrence of the lane change warning-requiring situation, the processor 171 may be configured to determine whether the current traveling lane of the vehicle is an appropriate lane for entering the branch path (the branch lane).

In other words, the processor 171 may be configured to determine whether the current traveling lane is appropriate for entering the branch path on the navigation path. When the driver activates a direction indicating signal that matches a direction in which the branch lane is located and the hands of the driver are on the steering wheel, the processor 171 does not generate the warning. When the driver does not activate the direction indicating signal in the direction in which the branch lane is located and when the driver is looking forward while the hands of the driver are separated from the steering wheel, the processor 171 may be configured to generate the visual warning and the auditory warning (e.g., a short warning sound). On the other hand, when the driver does not activate the direction indicating signal in the direction in which the branch lane is located and when the driver is not looking forward while the hands of the driver are separated from the steering wheel, the processor 171 may be configured to generate the auditory warning and/or the tactile warning together with the visual warning.

Warning-Requiring Situation of Function Deactivation or Limit of Driver Assist Device The processor 171 may be configured to detect deactivation of the operating driver assist function or reaching of limit of the driver assist device 100 as the warning-requiring situation. In response to detecting the warning-requiring situation, the processor 171 may be configured to determine whether the driver is looking forward using the detector 110 and output the warning by determining the warning mode based on the determination result. When a lane maintenance control function that is being operated while the hands of the driver are separated from the steering wheel is deactivated or when lane departure occurs during the lane maintenance control, the processor 171 may be configured to determine whether the driver is looking forward, determine the warning mode, and output the warning. The processor 171 may be configured to generate the visual warning and the auditory warning (e.g., the short warning sound) when the driver is looking forward. On the other hand, the processor 171 may be configured to generate the auditory warning and/or the tactile warning of a few seconds or longer together with the visual warning when the driver is not looking forward.

Cut-In Vehicle Warning-Requiring Situation

The processor 171 may be configured to detect a situation in which another vehicle that rapidly drives into the lane in which the vehicle (e.g., subject vehicle) is traveling is detected during the lane maintenance control as the cut-in vehicle warning-requiring situation. In this connection, the processor 171 may be configured to detect the cut-in vehicle using the detector 110. The processor 171 may be configured to determine whether the driver is looking at the cut-in vehicle using the detector 110 in response to detecting the cut-in vehicle warning-requiring situation. The processor 171 does not generate the warning when the driver is looking at the cut-in vehicle, and may be configured to generate the auditory warning and/or the tactile warning together with the visual warning when the driver is not looking at the cut-in vehicle.

Forward-Looking Warning-Requiring Situation

The processor 171 may be configured to detect a case in which a previously selected target vehicle is not recognized instantaneously during the inter-vehicle distance control as the forward-looking warning-requiring situation. When detecting the forward-looking warning-requiring situation, the processor 171 may be configured to determine whether the driver is looking forward through the driver state monitoring device 114. When the driver is looking forward, the processor 171 may be configured to output the visual warning, for example, a message such as "Please keep your eyes forward" on the display. On the other hand, when the driver is not looking forward, the processor 171 may be configured to output the auditory warning and/or the tactile warning simultaneously while outputting the visual warning.

Override Warning-Requiring Situation

The processor 171 may be configured to detect a case in which the driver overrides the inter-vehicle distance control by manipulating the accelerator pedal during the inter-vehicle distance control as the override warning-requiring situation. When the override warning-requiring situation occurs, the processor 171 may be configured to determine the warning mode based on whether the driver is looking forward using the detector 110 and output the warning. When the override warning-requiring situation is detected, the processor 171 does not generate the warning when the driver is looking forward. When the override warning-requiring situation is detected, the processor 171 may be configured to generate the auditory warning and/or the tactile warning in addition to the visual warning when the driver is not looking forward.

In addition, the processor 171 may be configured detect recognize a case in which the driver overrides the deceleration control by manipulating the accelerator pedal during deceleration control on a curved road as the override warning-requiring situation. In the override warning-requiring situation, when the driver is looking forward, the processor 171 does not generate the warning or only generates the visual warning. In the override warning-requiring situation, when the driver is not looking forward, the processor 171 may be configured to generate the auditory warning and/or the tactile warning in addition to the visual warning.

Diagonally-Rearward Warning-Requiring Situation

When the driver inputs the direction indicating signal by manipulating a direction indicator during the blind spot detection, the processor 171 may be configured to determine whether another vehicle is present in a direction matching the corresponding direction indicating signal. The processor 171 may be configured to detect a case in which there is another vehicle in the direction matching the direction indicating signal as the diagonally-rearward warning-requiring situation. In the diagonally-rearward warning-requiring situation, when the driver is looking at a side mirror in the direction matching the direction indicating signal, the processor 171 may be configured to output only the visual warning to the side mirror. On the other hand, in the diagonally-rearward warning-requiring situation, when the driver is not looking at the side mirror in the direction matching the direction indicating signal, the processor 171 may be configured to operate the user interface device 160 to output the auditory warning and/or the tactile warning in addition to the visual warning.

Figure 2:
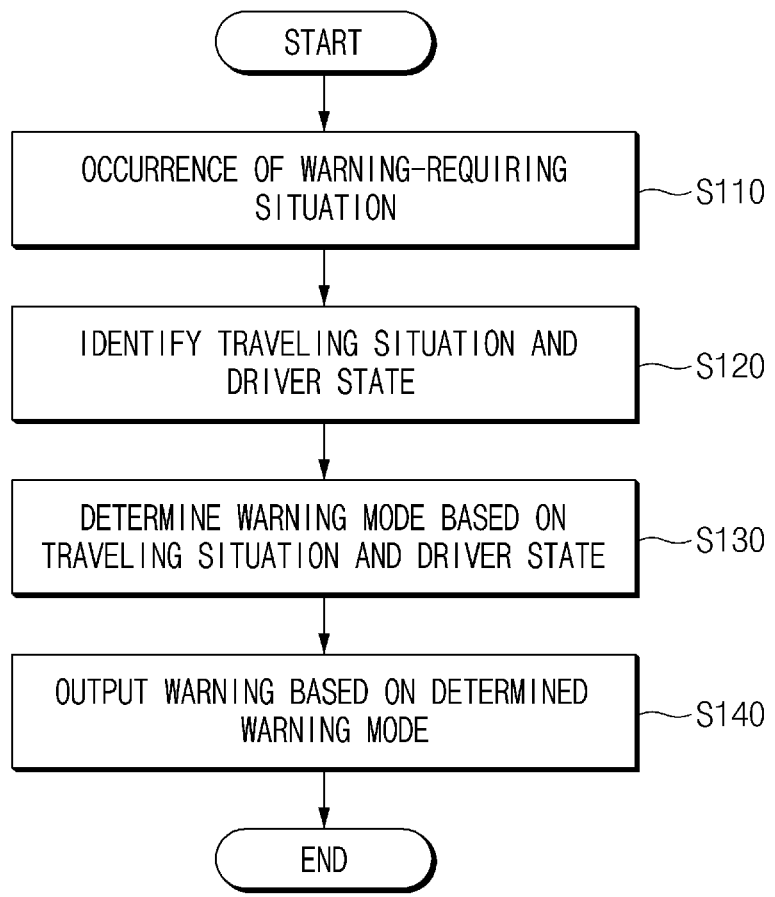
FIG. 2 is a flowchart illustrating an adaptive warning method of a driver assist device according to one exemplary embodiment of the present disclosure.

FIG. 2 is a flowchart illustrating an adaptive warning method of a driver assist device according to one exemplary embodiment of the present disclosure. Referring to FIG. 2, the controller 170 may be configured to detect the occurrence of the warning-requiring situation during the operation of the driver assist function (S110). The driver assist function may include the functions such as the lane maintenance control, the inter-vehicle distance control, the blind spot detection, and the like. The controller 170 may be configured to detect the traveling situation and the driver state using the detector 110 when the warning-requiring situation occurs (S120). The controller 170 may be configured to determine the warning mode based on the traveling situation and the driver state (S130). The controller 170 may be configured to select at least one of the visual warning the auditory warning, or the tactile warning as the warning mode.

The controller 170 may be configured to output the warning based on the determined warming mode (S140). In particular, the controller 170 may be configured to operate the user interface device 160 to output the visual warning, the auditory warning, and/or the tactile warning based on the determined warning mode. The controller 170 may be configured to measure the in-vehicle noise through the microphone 113 when outputting the auditory warning to determine whether the in-vehicle noise is equal to or greater than the preset reference noise level, and adjust the output of the auditory warning or replace the auditory warning with the tactile warning and output the tactile warning based on the determination result. In addition, when the field of view of the driver is obstructed when outputting the visual warning, the controller 170 may be configured to output the auditory warning and/or the tactile warning together.

Figure 3:
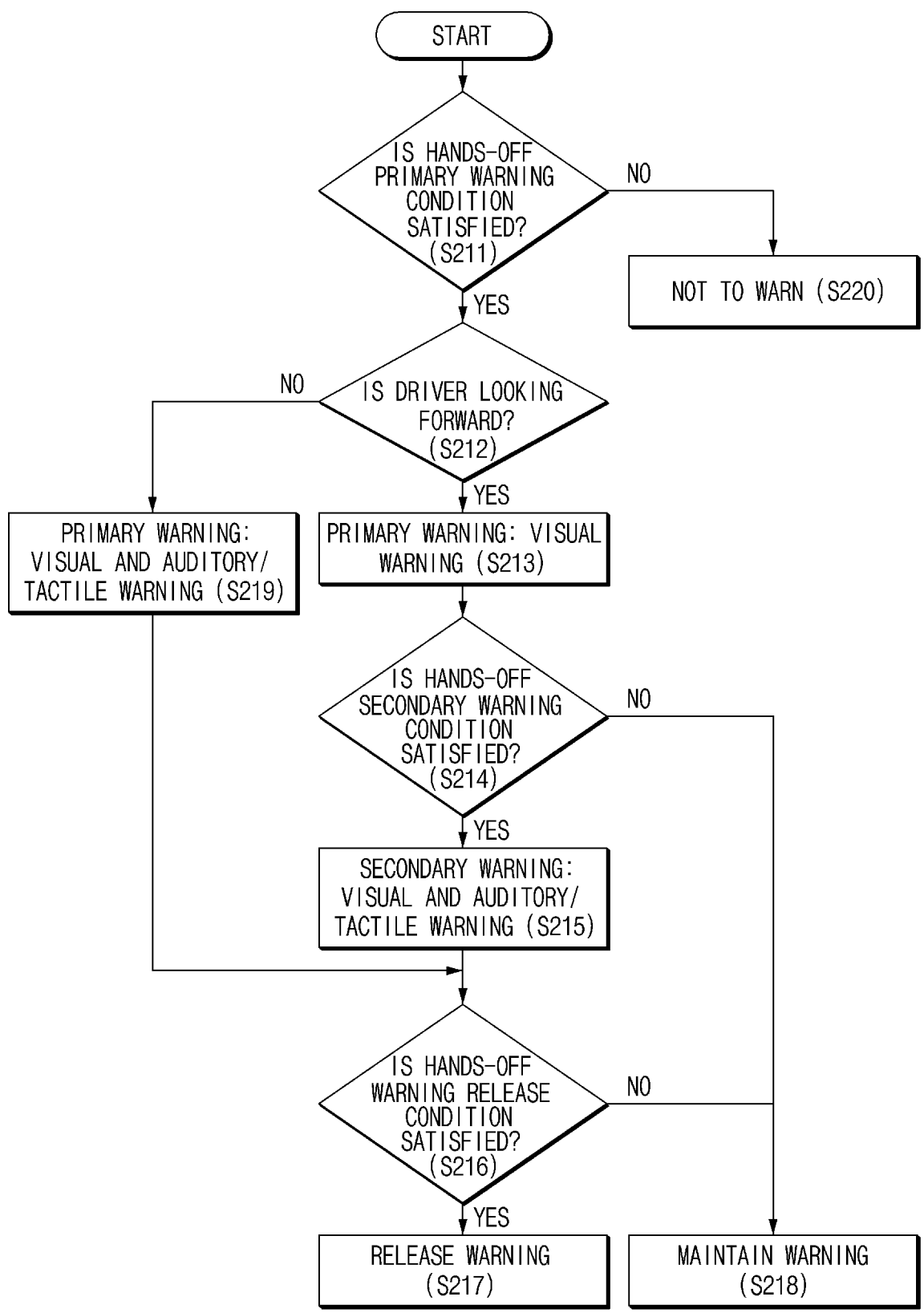
FIG. 3 is a flowchart illustrating an adaptive warning method in a hands-off waring-requiring situation according to one exemplary embodiment of the present disclosure.

FIG. 3 is a flowchart illustrating an adaptive warning method in a hands-off waring-requiring situation according to one exemplary embodiment of the present disclosure. The controller 170 may be configured to determine whether the driver state satisfies a hands-off primary warning condition while performing the lane maintenance control (S211). When the hands of the driver are separated from the steering wheel during operation of a lane maintenance control system, the controller 170 may be configured to determine that the hands-off primary warning condition is satisfied. On the other hand, when the hands of the driver are on the steering wheel during the operation of the lane maintenance control system, the controller 170 may be configured to determine that the hands-off primary warning condition is not satisfied.

In response to determining that the driver state satisfies the hands-off primary warning condition, the controller 170 may be configured to determine whether the driver is looking forward (S212). The controller 170 may be configured to output the visual warning as the primary warning when the driver is looking forward (S213). In other words, the controller 170 may be configured to select the visual warning as a primary warning mode in response to detecting that the driver is looking forward by the detector 110. The controller 170 may be configured to display a message such as "Please hold the steering wheel" on the display based on the selected primary warning mode.

After outputting the first warning, the controller 170 may be configured to determine whether the driver state satisfies a hands-off secondary warning condition (S214). In response to determining that the driver does not put the hands thereof on (grip) the steering wheel within a predetermined time after outputting the first warning, the controller 170 may be configured to determine that the hands-off secondary warning condition is satisfied.

When the driver state satisfies the hands-off secondary warning condition, the controller 170 may be configured to output a secondary warning (S215). The controller 170 may be configured to select the auditory warning and/or the tactile warning together with the visual warning as a secondary warning mode. For example, the controller 170 may be configured to output the message such as "Please hold the steering wheel" on the display and output the warning sound through the speaker when the visual warning and the auditory warning are selected as the secondary warning mode.

The controller 170 may be configured to determine whether the driver state satisfies a hands-off warning release condition (S216). When the driver is putting the hands thereof on the steering wheel, the controller 170 may be configured to determine that the hands-off warning release condition is satisfied. In response to determining that the driver state satisfies the hands-off warning release condition, the controller 170 may be configured to release the hands-off warning (S217). In response to determining that the driver state does not satisfy the hands-off warning release condition in S216, the controller 170 may be configured to maintain the hands-off warning (S218).

In S214, the controller 170 may be configured to maintain the output of the primary warning when the driver state does not satisfy the hands-off secondary warning condition (S218). In S219, the controller 170 may be configured to output the auditory warning and/or the tactile warning while outputting the visual warning as the primary warning when the driver is not looking forward in S212. In S220, the controller 170 does not generate the warning in response to determining that the driver state does not satisfy the hands-off primary warning condition in S211.

Figure 4:
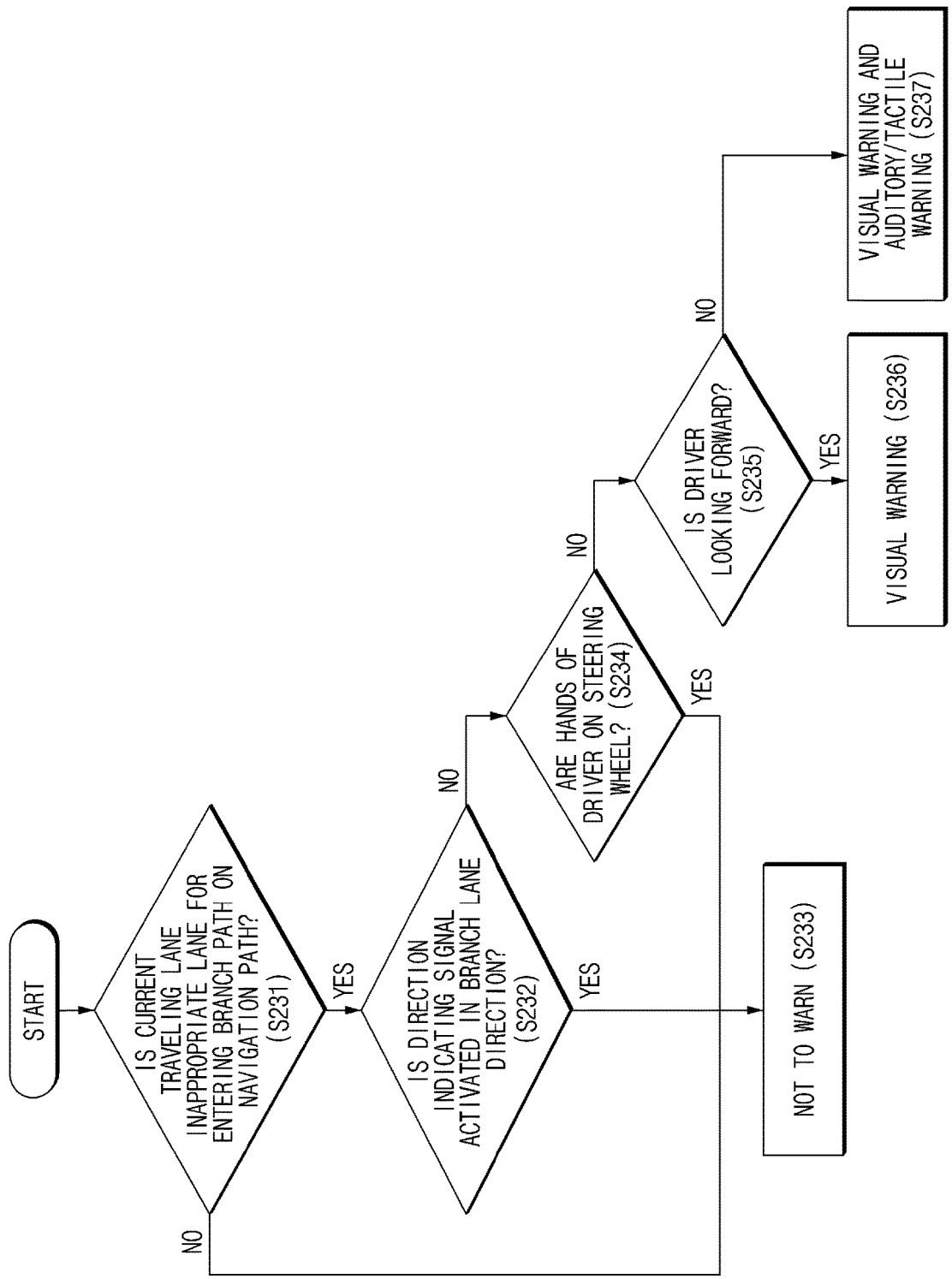
FIG. 4 is a flowchart illustrating an adaptive warning method in a lane change warning-requiring situation according to one exemplary embodiment of the present disclosure.

FIG. 4 is a flowchart illustrating an adaptive warning method in a lane change warning-requiring situation according to one exemplary embodiment of the present disclosure. The controller 170 may be configured to determine whether the current traveling lane of the vehicle is an inappropriate lane for entering the branch path on the navigation path during the lane maintenance control (S231). For example, when vehicle is within the certain distance from the branch point while not traveling in the branch lane for entering the branch path on the navigation path or not traveling in the lane right next to the branch lane, the controller 170 may be configured to detect such case as the lane change warning-requiring situation.

The controller 170 may be configured to determine whether the direction indicating signal matching the direction in which the branch lane is located is activated (S232). For example, when the branch lane is located in a right direction of the vehicle, the controller 170 may be configured to determine whether a right direction indicating light is turned on. When the direction indicating signal matching the branch lane direction is activated, the controller 170 does not generate the warning (S233). When the direction indicating signal matching the branch lane direction is not activated, the controller 170 may be configured to determine whether the hands of the driver are on the steering wheel (S234). In response to determine that the hands of the driver are on the steering wheel (e.g., determining that the steering wheel is gripped by a driver), the controller 170 does not output the warning (S233).

The controller 170 may be configured to determine whether the driver is looking forward when the hands of the driver are separated from the steering wheel (S235) (e.g., the steering wheel is not gripped). The controller 170 may be configured to only output the visual warning when the driver is looking forward (S236). For example, the controller 170 may be configured to output a message such as 'Please change the lane' on the display. In this connection, the controller 170 may be configured to generate the auditory warning such as the short warning sound together. On the other hand, the controller 170 may be configured to output the auditory warning and/or the tactile warning together with the visual warning in response to determining in S325 that the driver is not looking forward (S237).

Figure 5:
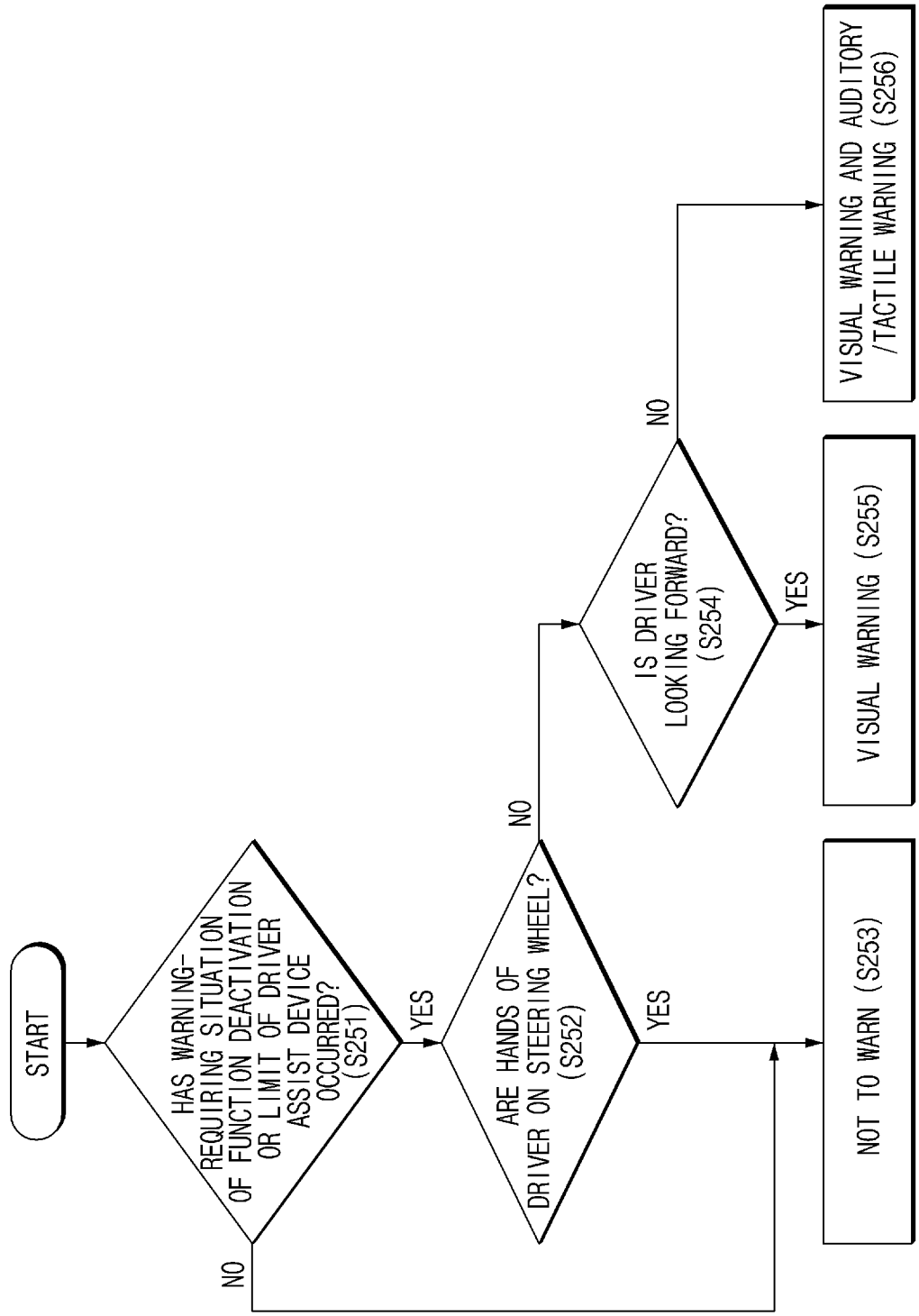
FIG. 5 is a flowchart illustrating an adaptive warning method in a warning-requiring situation of a function deactivation or limit of a driver assist device according to one exemplary embodiment of the present disclosure.

FIG. 5 is a flowchart illustrating an adaptive warning method in a warning-requiring situation of a function deactivation or limit of a driver assist device according to one exemplary embodiment of the present disclosure. The controller 170 may be configured to determine whether the warning-requiring situation of the function deactivation or limit of the driver assist device 100 has occurred (S251). The controller 170 may be configured to detect a case in which the lane maintenance control function is deactivated while the hands of the driver are separated from the steering wheel or the lane departure occurs during the lane maintenance control as the occurrence of the warning-requiring situation.

The controller 170 may be configured to determine whether the hands of the driver are on the steering wheel when the warning-requiring situation of the function deactivation or limit of the driver assist device 100 occurs (S252). In response to determining the hands of the driver are on the steering wheel (e.g., steering wheel is being gripped), the controller 170 does not output the warning (S253). In response to determining that the hands of the driver are separated from the steering wheel, the controller 170 may be configured to determine whether the driver is looking forward (S254). The controller 170 may be configured to output only the visual warning when the driver is looking forward (S255). The controller 170 may be configured to output the auditory warning and/or the tactile warning together with the visual warning when the driver is not looking front (S256).

Figure 6:
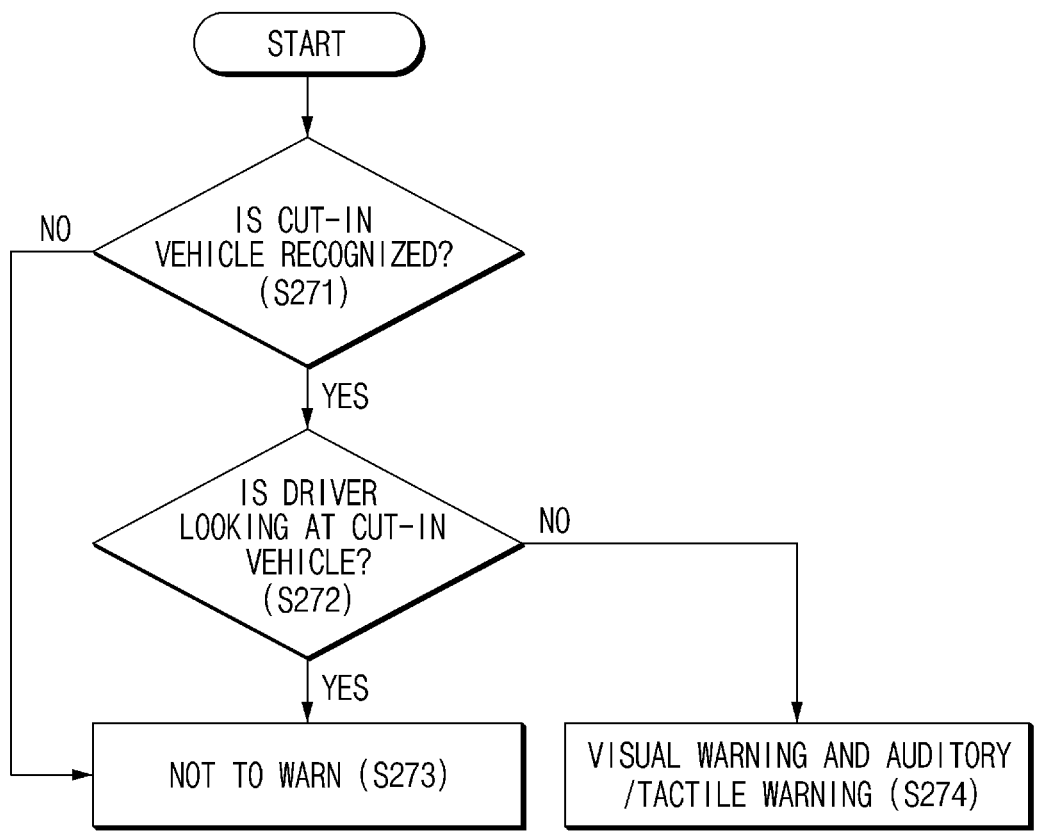
FIG. 6 is a flowchart illustrating an adaptive warning method in a cut-in vehicle warning-requiring situation according to one exemplary embodiment of the present disclosure.

FIG. 6 is a flowchart illustrating an adaptive warning method in a cut-in vehicle warning-requiring situation according to one exemplary embodiment of the present disclosure. The controller 170 may be configured to determine whether the cut-in vehicle is detected during the lane maintenance control (S271). In particular, the controller 170 may be configured to detect another vehicle that cuts rapidly into the traveling lane of the vehicle using the detector 110.

When the cut-in vehicle is detected, the controller 170 may be configured to determine whether the driver is looking at the cut-in vehicle (S272). The controller 170 may be configured to detect a driver's gaze direction using the detector 110 and determine whether the detected gaze direction and a direction in which the cut-in vehicle is located match. The controller 170 does not generate the warning when the driver is looking at the cut-in vehicle (S273). When the driver is not looking at the cut-in vehicle, the controller 170 may be configured to generate the auditory warning and/or the tactile warning together with the visual warning (S274). For example, the controller 170 may be configured to output the message such as "Please keep your eyes forward" on the display and simultaneously convert the text message to a voice signal and output the voice signal.

Figure 7:
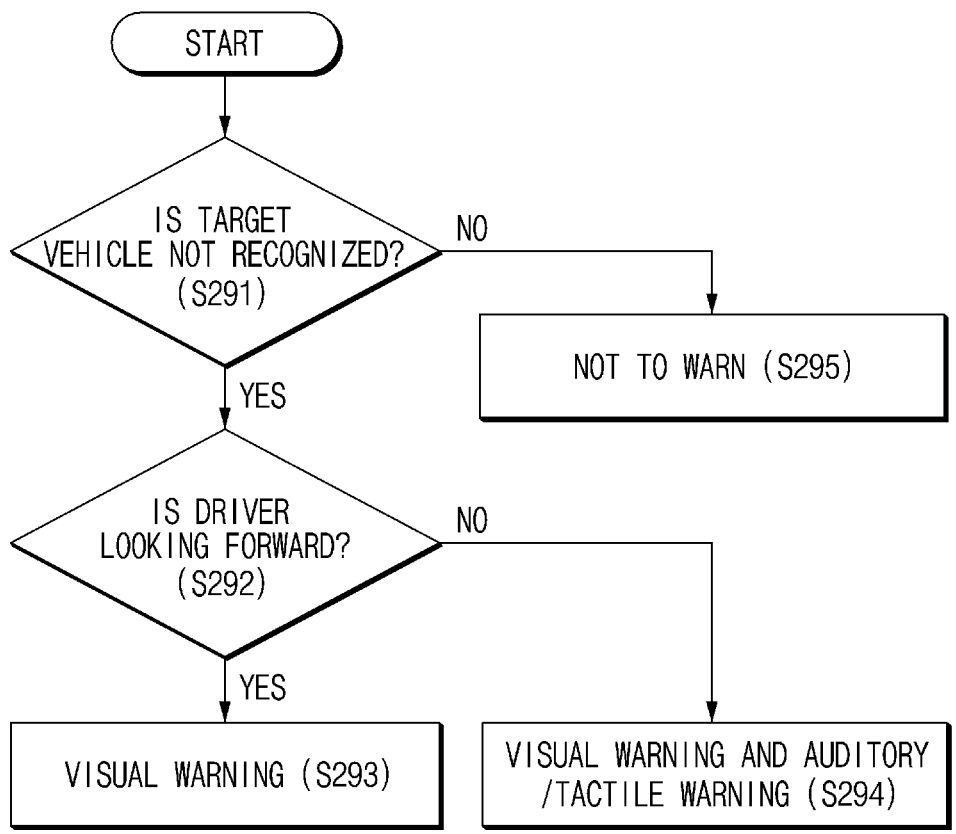
FIG. 7 is a flowchart illustrating an adaptive warning method in a forward-looking warning-requiring situation according to one exemplary embodiment of the present disclosure.

FIG. 7 is a flowchart illustrating an adaptive warning method in a forward-looking warning-requiring situation according to one exemplary embodiment of the present disclosure. The controller 170 may be configured to determine whether the target vehicle is not recognized during the inter-vehicle distance control (S291). The controller 170 may be configured to detect the case in which the previously selected target vehicle is not recognized instantaneously while the vehicle is traveling while maintaining the inter-vehicle distance from the target vehicle as the forward-looking warning-requiring situation.

The controller 170 may be configured to determine whether the driver is looking forward when the target vehicle is not recognized (S292). Additionally, the controller 170 may be configured to output the visual warning when the driver is looking forward (S293). The controller 170 may be configured to output the visual warning and the auditory warning when the driver is not looking forward (S294). The controller 170 does not output the warning when the situation in which the target vehicle is not recognized during the inter-vehicle distance control does not occur (S295). In other words, when a state in which the target vehicle is unrecognized during the inter-vehicle distance control does not occur, the controller 170 does not generate the warning because such state is not the forward-looking warning-requiring situation.

Figure 8:
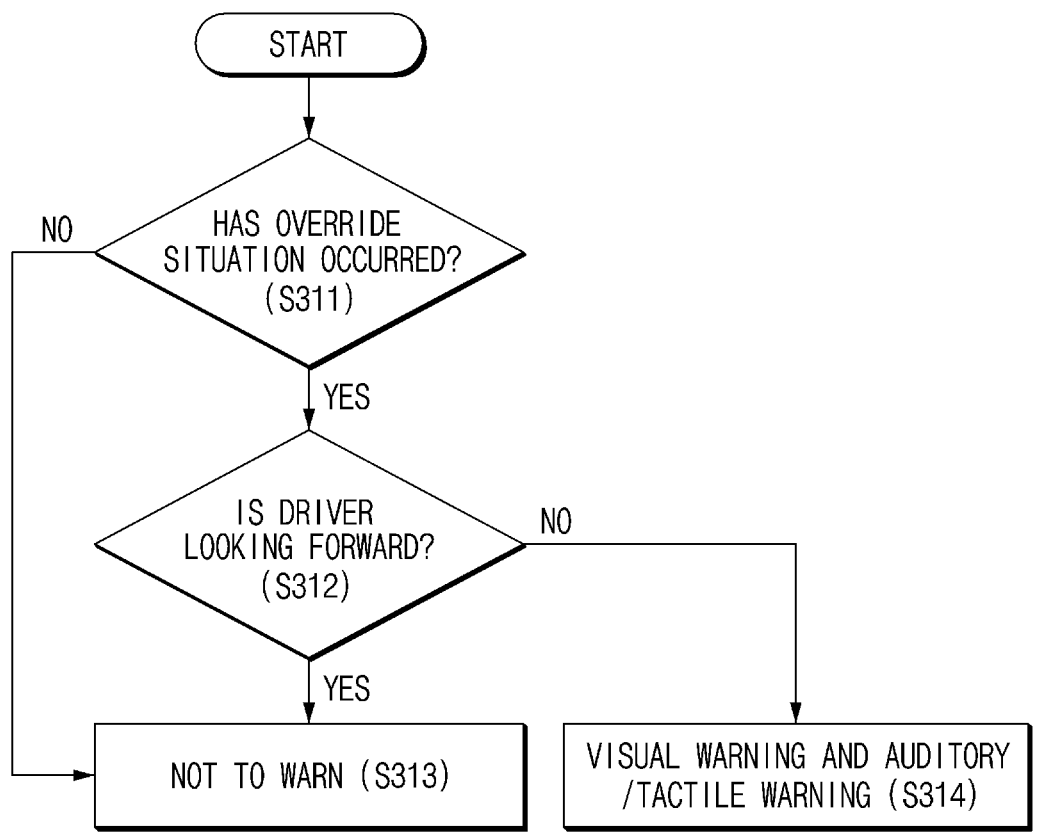
FIG. 8 is a flowchart illustrating an adaptive warning method in an override waring-requiring situation according to one exemplary embodiment of the present disclosure.

FIG. 8 is a flowchart illustrating an adaptive warning method in an override warning-requiring situation according to one exemplary embodiment of the present disclosure. The controller 170 may be configured to determine whether the situation in which the driver overrides the driver assist function by manipulating the accelerator pedal has occurred (S311). For example, the controller 170 may be configured to detect a case in which, during the inter-vehicle distance control or during the deceleration control on the curved road, the driver overrides the corresponding inter-vehicle distance control function or deceleration control function by manipulating the accelerator pedal as the override warning-requiring situation.

The controller 170 may be configured to determine whether the driver is looking forward when the override situation occurs (S312). In particular, the controller 170 may be configured to determine whether the driver is looking forward using the detector 110 in response to detecting that the driver assist function is overridden. The controller 170 does not output the warning when the driver is looking forward (S313). In other words, the controller 170 may be configured to determine not to warn as the warning mode when the driver is looking forward in the override situation. When the driver is not looking forward, the controller 170 may be configured to output the auditory warning and/or the tactile warning in addition to the visual warning (S314). The controller 170 may be configured to output the auditory warning and/or the tactile warning together with the visual warning when the driver is not looking forward in the override situation.

Figure 9:
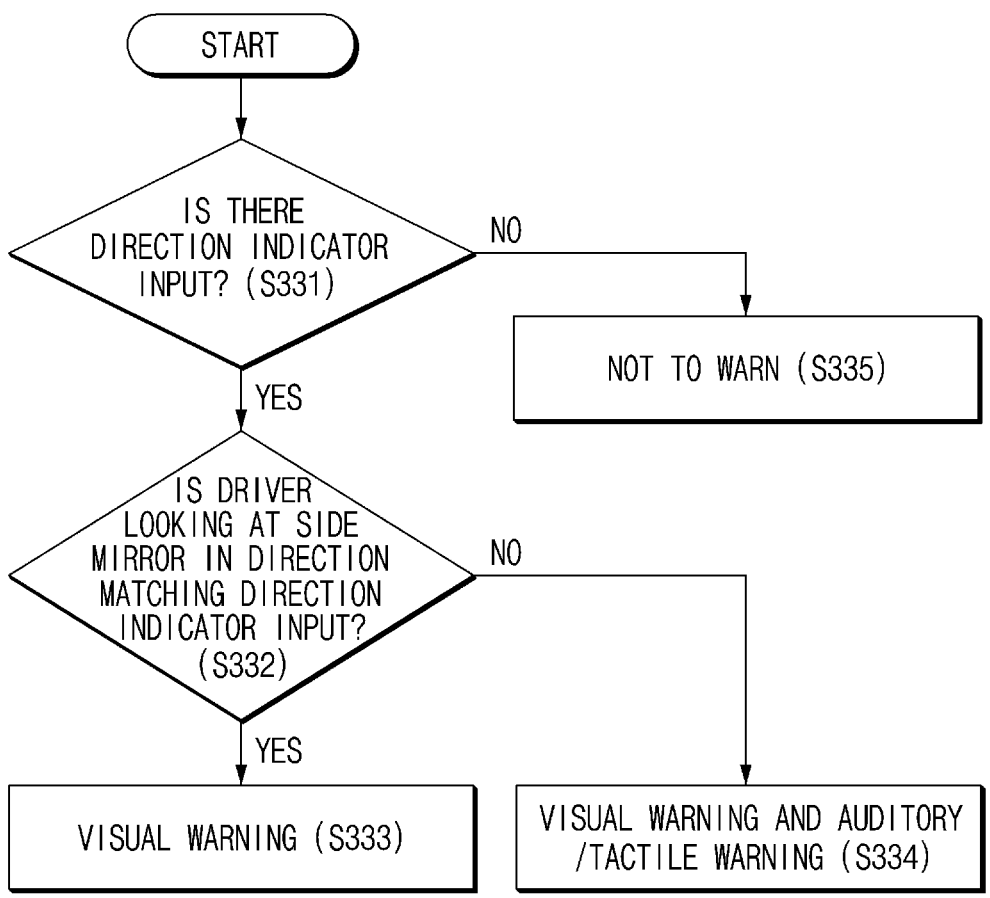
FIG. 9 is a flowchart illustrating an adaptive warning method in a diagonally-rearward warning-requiring situation according to one exemplary embodiment of the present disclosure.

FIG. 9 is a flowchart illustrating an adaptive warning method in a diagonally-rearward warning-requiring situation according to one exemplary embodiment of the present disclosure. The controller 170 may be configured to determine whether there is a direction indicator input of the driver during the blind spot detection (S331). In particular, the controller 170 may be configured to determine whether there is manipulation of the direction indicator by the driver during the blind spot detection (e.g., an operation of a diagonally-rearward warning system).

The controller 170 may be configured to determine whether the driver is looking at the side mirror in a direction matching the direction indicator input (S332). Particularly, the controller 170 may be configured to determine whether the driver is looking at the side mirror in the direction matching the direction indicator input (e.g., the direction indicating signal) through the detector 110. The controller 170 does not output the warning when the driver is looking at the side mirror that matches the direction indicator input (S333). In response to determining that the driver is not looking at the side mirror that matches the direction indicator input, the controller 170 may be configured to output the auditory warning and/or the tactile warning in addition to the visual warning (S334). When there is no direction indicator input of the driver during the blind spot detection, the controller 170 does not output the warning (S335).

Figure 10:
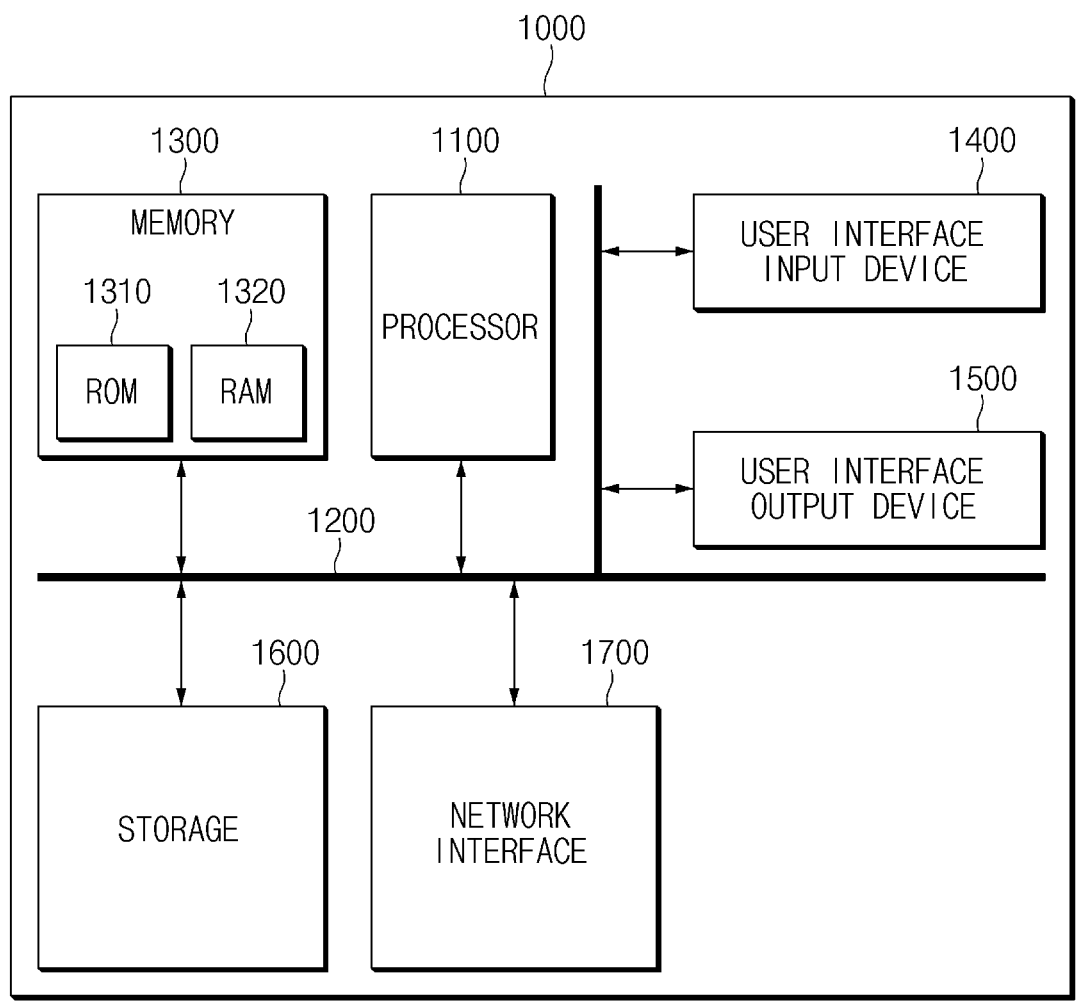
FIG. 10 is a block diagram illustrating a computing system executing an adaptive warning method according to one exemplary embodiment of the present disclosure.

FIG. 10 is a block diagram illustrating a computing system executing an adaptive warning method according to one exemplary embodiment of the present disclosure. With reference to FIG. 10, a computing system 1000 may include at least one processor 1100, a memory 1300, a user interface input device 1400, a user interface output device 1500, storage 1600, and a network interface 1700 connected via a bus 1200. The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, a CD-ROM. The exemplary storage medium is coupled to the processor 1100, which may read information from, and write information to, the storage medium. In another method, the storage medium may be integral with the processor 1100. The processor 1100 and the storage medium may reside within an application specific integrated circuit (ASIC). The ASIC may reside within the user terminal. In another method, the processor 1100 and the storage medium may reside as individual components in the user terminal.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the present disclosure, the warning may be output based on the driver state and the traveling situation, to thus deliver a purpose of the warning to the driver more effectively. In addition, according to the present disclosure, the warning may be output based on the driver state and the traveling situation, so that unnecessary warning that interferes with driving or makes the driver uncomfortable in a situation that may be handled by the driver may be limited.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A driver assist device, comprising:
 a processor; and
 a non-transitory storage medium containing program instructions that, when executed by the processor causes the driver assist device to:
  detect outdoor information and indoor information of a vehicle using a detector;
  determine a warning mode based on a traveling situation and a driver state detected by the detector in response to detecting a warning-requiring situation during an operation of a driver assist function; and
  output a warning based on the determined warning mode,
 wherein the processor is configured to output at least one of an auditory warning or a tactile warning when a field of view of a driver is obstructed when outputting a visual warning as the warning.

2. The driver assist device of claim 1, wherein the processor is configured to:
 determine the visual warning when a driver gaze is forward in response to detecting a hands-off warning-requiring situation; and
 determine at least one of the auditory warning or the tactile warning together with the visual warning when the driver gaze is not forward.

3. The driver assist device of claim 1, wherein the processor is configured not to output the warning in a state in which a direction indicating signal is activated in a lane change direction or a steering wheel is gripped by the driver in response to detecting a lane change warning-requiring situation.

4. The driver assist device of claim 3, wherein the processor is configured to:
 determine the visual warning when the driver gaze is forward in a state in which the direction indicating signal is not activated in the lane change direction and the steering wheel is not gripped by the driver; and
 determine at least one of the auditory warning or the tactile warning together with the visual warning when the driver gaze is not forward in the state in which the direction indicating signal is not activated in the lane change direction and the steering wheel is not gripped.

5. The driver assist device of claim 1, wherein the processor is configured to:
 determine the visual warning when a driver gaze is forward in a state in which a steering wheel is not gripped by a driver in response to detecting a warning-requiring situation of deactivation or limit of the driver assist function; and
 determine at least one of the auditory warning or the tactile warning together with the visual warning when the driver gaze is not forward in the state in which the steering wheel is not gripped.

6. The driver assist device of claim 1, wherein the processor is configured to determine at least one of the auditory warning or the tactile warning together with the visual warning when a driver gaze is not at a cut-in vehicle in response to detecting a cut-in vehicle warning-requiring situation.

7. The driver assist device of claim 1, wherein the processor is configured to:
determine the visual warning when a driver gaze is forward in response to detecting a forward-looking warning-requiring situation; and
determine at least one of the auditory warning or the tactile warning together with the visual warning when the driver gaze is not forward.

8. The driver assist device of claim 1, wherein the processor is configured to determine at least one of the auditory warning or the tactile warning together with the visual warning when the driver gaze is not forward in response to detecting an override warning-requiring situation.

9. The driver assist device of claim 1, wherein the processor is configured to:
determine the visual warning when a driver gaze is directed at a side mirror in a direction matching a direction indicator input in response to detecting a diagonally-rearward warning-requiring situation; and
determine at least one of the auditory warning or the tactile warning together with the visual warning when the driver gaze is not directed at the side mirror in the direction matching the direction indicator input.

10. The driver assist device of claim 1, wherein the processor is configured to, in response to determining that an in-vehicle noise level measured by the detector is equal to or greater than a preset reference noise level when outputting the auditory warning, adjust the output of the auditory warning or replace the auditory warning with the tactile warning and output the tactile warning.

11. An adaptive warning method of a driver assist device, comprising:
detecting, by a processor, a warning-requiring situation during an operation of a driver assist function;
determining, by the processor, a warning mode based on a traveling situation and a driver state in response to detecting the warning-requiring situation; and
outputting, by the processor, a warning based on the determined warning mode,
wherein the outputting of the warning includes outputting at least one of an auditory warning or a tactile warning when a field of view of a driver is obstructed when outputting a visual warning as the warning.

12. The method of claim 11, wherein the determining of the warning mode includes:
determining, by the processor, the visual warning when a driver gaze is forward in a hands-off warning-requiring situation; and
determining, by the processor, at least one of the auditory warning or the tactile warning together with the visual warning when the driver gaze is not forward.

13. The method of claim 11, wherein the determining of the warning mode includes:
determining, by the processor, not to warn when a direction indicating signal is activated in a lane change direction or when a steering wheel is gripped by the driver in a lane change warning-requiring situation.

14. The method of claim 13, wherein the determining of the warning mode further includes:
determining, by the processor, the visual warning when the driver gaze is forward in a state in which the direction indicating signal is not activated in the lane change direction and the steering wheel is not gripped by the driver; and
determining at least one of the auditory warning or the tactile warning together with the visual warning when the driver gaze is not forward in the state in which the direction indicating signal is not activated in the lane change direction and the steering wheel is not gripped by the driver.

15. The method of claim 11, wherein the determining of the warning mode includes:
determining, by the processor, the visual warning when a driver gaze is forward in a state in which a steering wheel is gripped by a driver in a warning-requiring situation of deactivation or limit of the driver assist function; and
determining, by the processor, at least one of the auditory warning or the tactile warning together with the visual warning when the driver gaze is not forward in the state in which the steering wheel is not gripped by the driver.

16. The method of claim 11, wherein the determining of the warning mode includes:
determining, by the processor, at least one of the auditory warning or the tactile warning together with the visual warning when a driver gaze is not directed at a cut-in vehicle in a cut-in vehicle warning-requiring situation.

17. The method of claim 11, wherein the determining of the warning mode includes:
determining, by the processor, the visual warning when a driver gaze is forward in a forward-looking warning-requiring situation; and
determining, by the processor, at least one of the auditory warning or the tactile warning together with the visual warning when the driver gaze is not forward.

18. The method of claim 11, wherein the determining of the warning mode includes:
determining, by the processor, at least one of the auditory warning or the tactile warning together with the visual warning when the driver gaze is not forward in response to detecting an override warning-requiring situation.

19. The method of claim 11, wherein the determining of the warning mode includes:
determining, by the processor, the visual warning when a driver gaze is directed at a side mirror in a direction matching a direction indicator input in a diagonally-rearward warning-requiring situation; and
determining, by the processor, at least one of the auditory warning or the tactile warning together with the visual warning when the driver gaze is not directed at the side mirror in the direction matching the direction indicator input.

* * * * *